(12) United States Patent
Huang

(10) Patent No.: US 7,628,498 B1
(45) Date of Patent: Dec. 8, 2009

(54) POSITIONING DEVICE OF A VEHICLE EXTERIOR AUXILIARY REAR MIRROR

(76) Inventor: Wen Huang, No. 149 (Room 9, 10/F.) Lin Sen Road, Sec. 1, Tainan (TW) 701

( * ) Notice: Subject to any disclaimer, the term of this patent is extended or adjusted under 35 U.S.C. 154(b) by 0 days.

(21) Appl. No.: 12/317,328

(22) Filed: Dec. 23, 2008

(51) Int. Cl.
*G02B 5/08* (2006.01)
*G02B 7/182* (2006.01)
*B60R 1/06* (2006.01)

(52) U.S. Cl. ........................ 359/871; 359/872
(58) Field of Classification Search ............ 359/850, 359/854, 865, 871, 872; 248/475.1, 476, 248/477, 478, 479
See application file for complete search history.

(56) References Cited

U.S. PATENT DOCUMENTS

| | | | | |
|---|---|---|---|---|
| 3,954,328 A | * | 5/1976 | Ames | 359/865 |
| 4,892,400 A | * | 1/1990 | Brookes et al. | 359/865 |
| 4,892,401 A | * | 1/1990 | Kittridge et al. | 359/850 |
| 4,927,255 A | * | 5/1990 | Martinez | 359/855 |
| 5,096,283 A | * | 3/1992 | Croteau | 359/865 |
| 5,296,973 A | * | 3/1994 | Burke | 359/865 |
| D350,521 S | * | 9/1994 | Hu | D12/187 |
| 5,724,199 A | * | 3/1998 | Hu | 359/872 |
| 5,870,236 A | * | 2/1999 | Barksdale | 359/872 |
| 6,988,810 B2 | * | 1/2006 | Chen | 359/871 |
| 7,059,734 B1 | * | 6/2006 | Hu | 359/872 |
| 7,150,538 B2 | * | 12/2006 | Vander Horst | 359/871 |
| D545,256 S | * | 6/2007 | Hu | D12/187 |

* cited by examiner

*Primary Examiner*—Ricky D Shafer

(57) ABSTRACT

A positioning device of a vehicle exterior auxiliary rear mirror includes a connecting base, two curved arms and two fixing arms. The connecting base is integrally formed on a back of an auxiliary rear mirror near a vehicle exterior rear mirror, shaped rectangular with two pivotal connecting points properly spaced apart at one side. The curved arms have one end pivotally connected with the connecting points of the connecting base, and another end provided with two locking projections and two positioning bands crossly extended for being tightened on a rear surface of the exterior rear mirror. With the curved arms able to alter their included angle and with the fixing arms extendable to change the length, the positioning device can be positioned on diverse exterior rear mirrors.

3 Claims, 8 Drawing Sheets

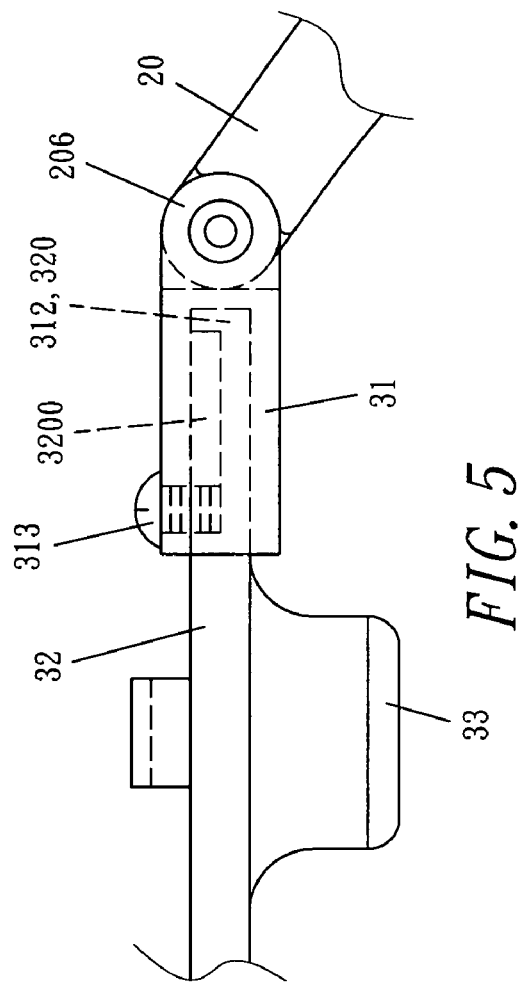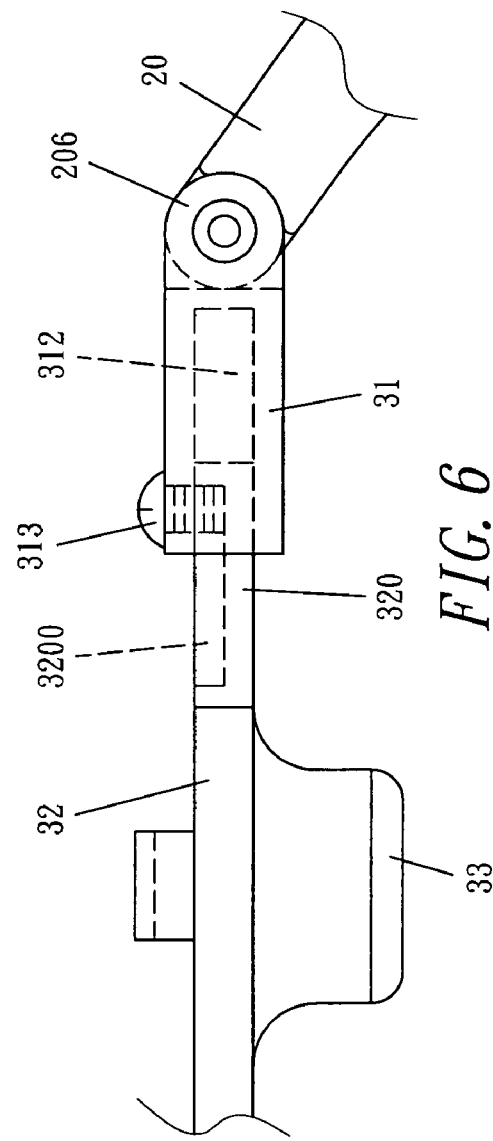

POSITIONING DEVICE OF A VEHICLE EXTERIOR AUXILIARY REAR MIRROR

BACKGROUND OF THE INVENTION

1. Field of the Invention

This invention relates to a positioning device of a vehicle exterior auxiliary rear mirror, particularly to one able to alter the included angle of its curved arms and the length of its fixing arms, available for a variety of exterior rear mirrors.

2. Description of the Prior Art

Commonly, vehicle exterior rear mirrors are an indispensable component employed to help a driver to clearly see the situation behind him, so as to prevent any accident from happening. In order to obtain a wider view via the rear mirrors, an auxiliary mirror is usually installed at an outer edge of each of the rear mirrors. U.S. Pat. No. 6,988,810 discloses such a conventional auxiliary mirror of a vehicle exterior rear mirror; however, it has a complicated structure forcing manufacturing cost stepped up.

SUMMARY OF THE INVENTION

The object of this invention is to offer a positioning device of a vehicle exterior auxiliary rear mirror, having a simple structure and available for a variety of exterior rear mirrors.

The main characteristics of the invention are a connecting base, two curved arms and two fixing arms. The connecting base is integrally formed on a back of an auxiliary rear mirror near a vehicle exterior rear mirror, shaped rectangular with two pivotal connecting points properly spaced apart at one side. The curved arms have a first end pivotally connected with the connecting points of the connecting base. The fixing arms have a first end connected with a second end of the curved arms respectively, and a second end provided with two locking projections and two positioning bands crossly extended for being tightened on a rear surface of the exterior rear mirror. With the curved arms able to alter their included angle and with the fixing arms extendable to change the length, the positioning device is thus able to be positioned on diverse exterior rear mirrors.

BRIEF DESCRIPTION OF DRAWINGS

This invention is better understood by referring to the accompanying drawings, wherein:

FIG. 5 is a magnified cross-sectional view of a fixing arm in the present invention, showing it being shrunk to a shortest length;

FIG. 6 is a magnified cross-sectional view of the fixing arm in the present invention, showing it being extended to a longest length;

DETAILED DESCRIPTION OF THE PREFERRED EMBODIMENT

Figure 1:
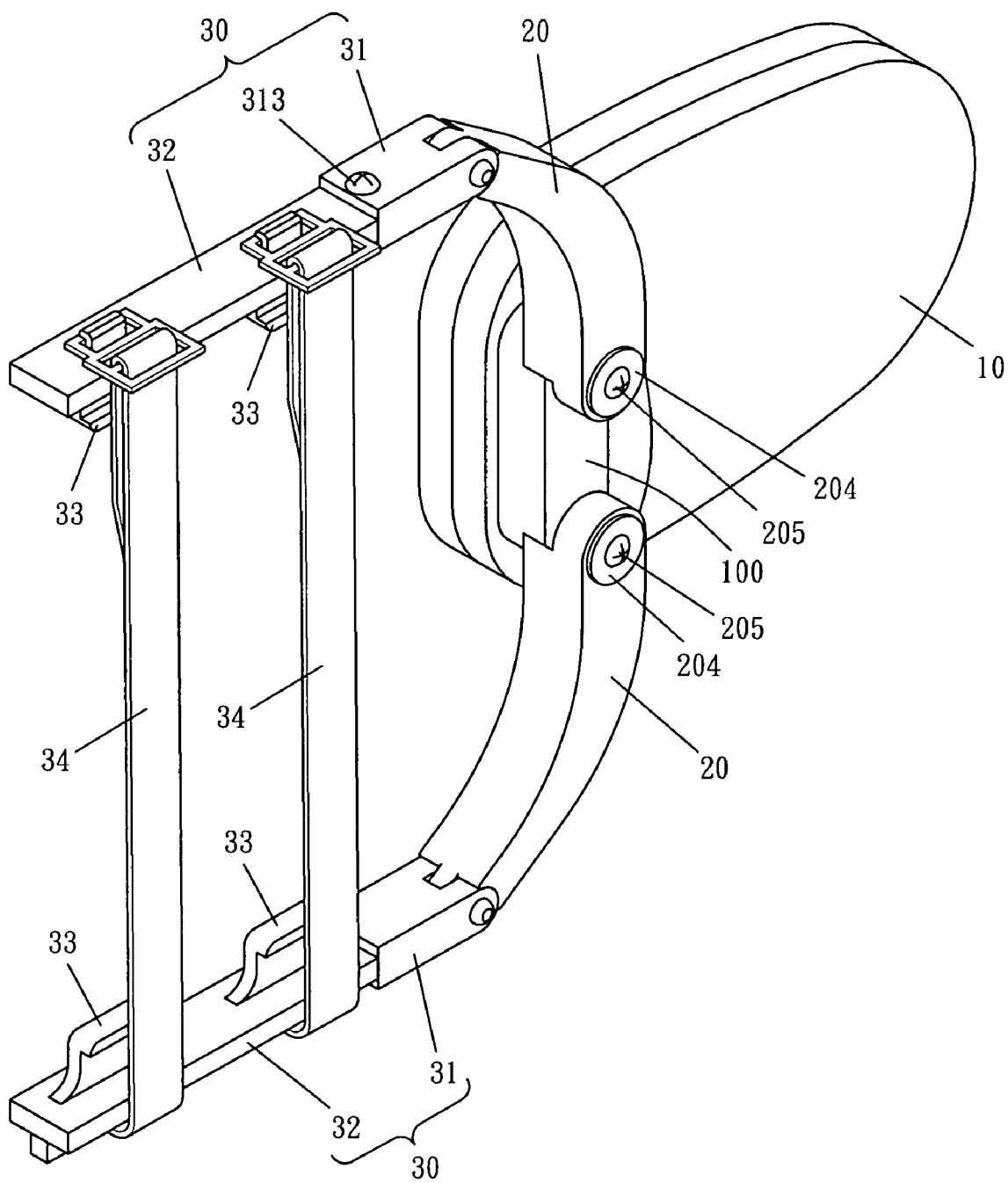
FIG. 1 is a perspective view of a preferred embodiment of a positioning device of a vehicle exterior auxiliary rear mirror in the present invention.
Figure 2:
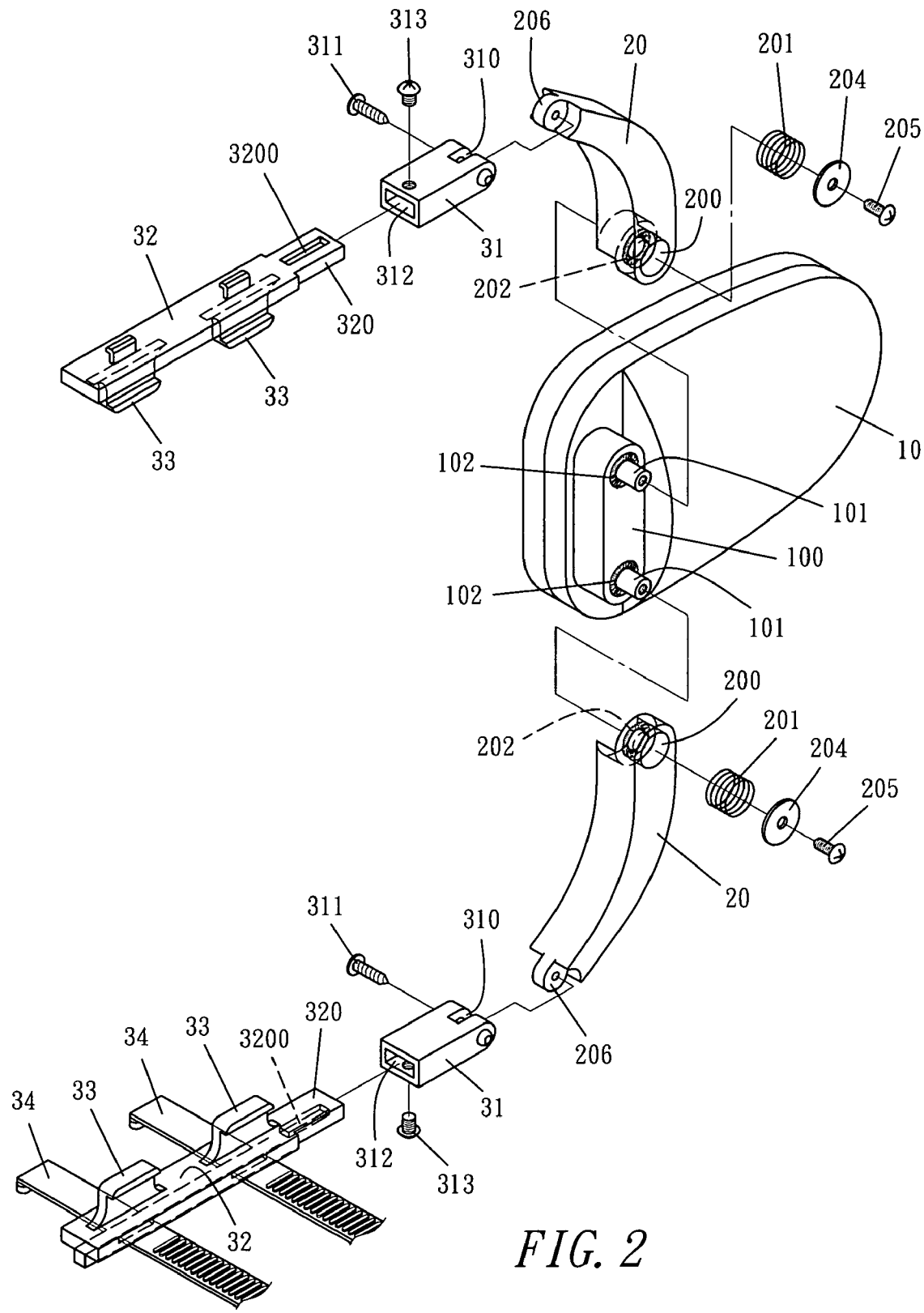
FIG. 2 is an exploded perspective view of the preferred embodiment of a positioning device of a vehicle exterior auxiliary rear mirror in the present invention.

As shown in FIGS. 1 and 2, a preferred embodiment of a positioning device of a vehicle exterior auxiliary rear mirror 10 in the present invention includes a connecting base 100, two curved arms 20 and two fixing arms 30.

The connecting base 100 is integrally formed on a back of the auxiliary rear mirror 10, near a vehicle exterior rear mirror 40, shaped rectangular with two female-threaded tubes 101 properly spaced apart and extended up at one side. Formed around the bottom of each of the tubes 101 is a first annular gear teeth 102.

Figure 4:
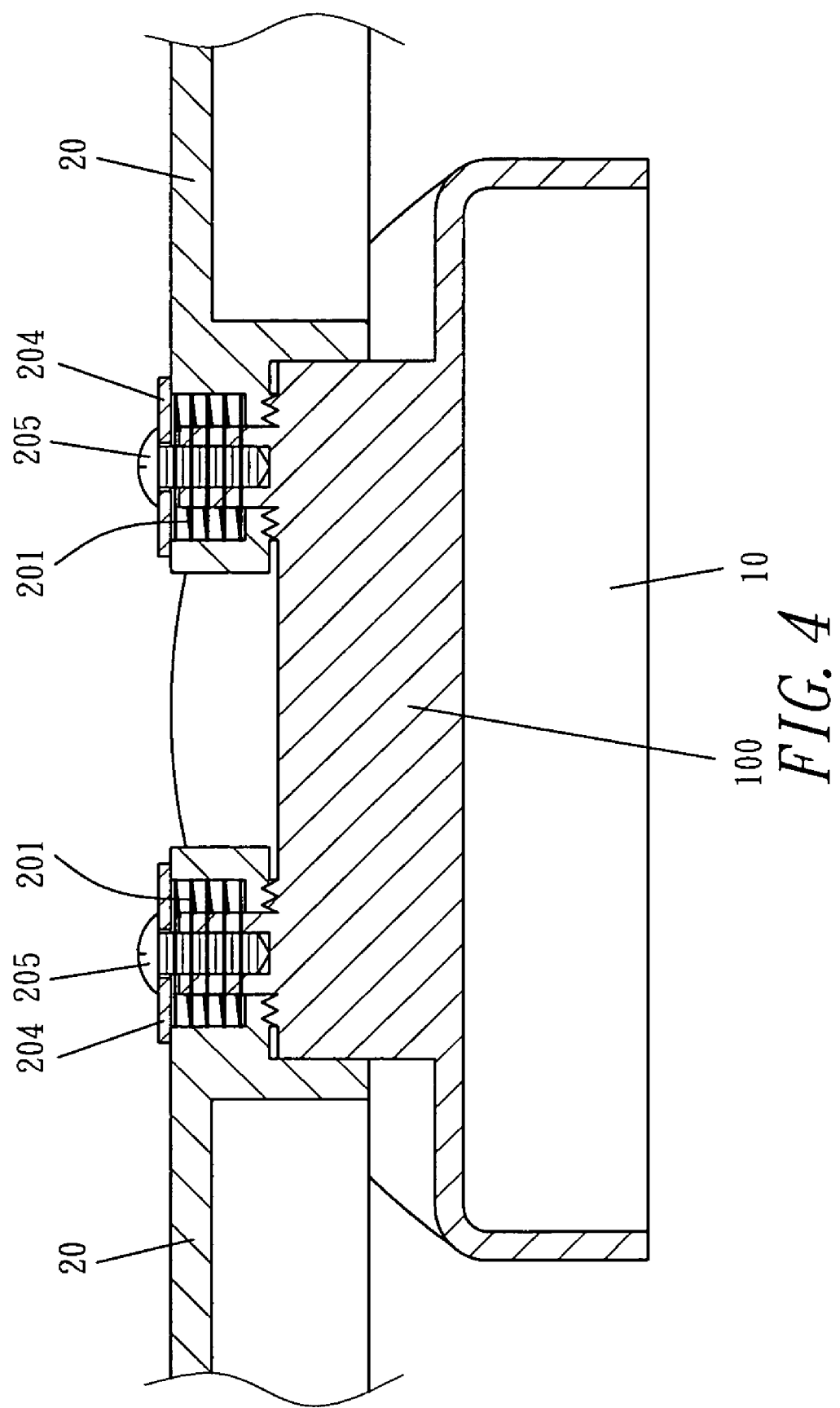
FIG. 4 is a cross-sectional view of a "4-4" line in FIG. 3.
Figure 7:
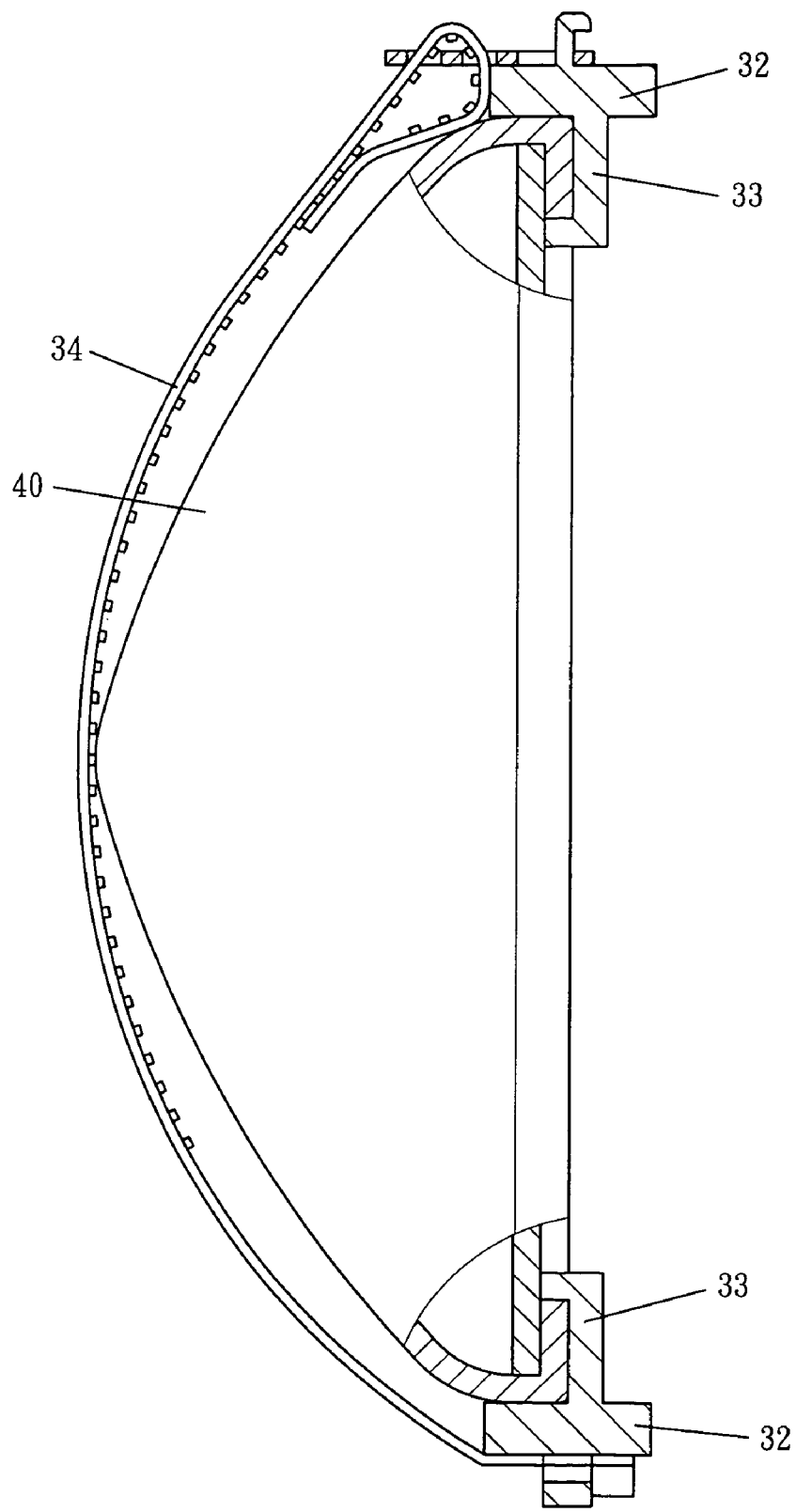
FIG. 7 is a cross-sectional view of the preferred embodiment of a positioning device of a vehicle exterior auxiliary rear mirror in the present invention, showing it being fastened on a vehicle exterior rear mirror.

Each of the curved arms 20 is provided with a through hole 200 that is bored in a first end for being inserted by the tube 101 of the connecting base 100, with the diameter gradually tapered from the top to the bottom, and an elastic element 201 (such as a spring) mounted around the tube 101 in the upper portion of the through hole 200. Laid on the through hole 200 is a washer 204, which is successively inserted through by a first fastening element 205 (such as a screw) employed to engage with female threads of the tube 101, so as to keep the curved arms 20 pivotally fixed with the connecting base 100 and the elastic element 201 from springing off. With the elastic element 201, the curved arms 20 are to be pressed to closely contact with the connecting base 100. The curved arms 20 are respectively provided with a second annular gear teeth 202 formed around a circumference of one side of the through hole 200 corresponding to the first annular gear teeth 102 of the connecting base 100, so that the first annular gear teeth 102 can be tightly engaged with the second annular gear teeth 202 by the elastic force of the elastic element 201, as shown in FIG. 4. Further, each curved arm 20 is provided with pivotal connecting protrusion 206 formed at a second end.

Each of the fixing arms 30 is composed of a female arm 31, a male arm 32, and two locking projections 33, and one of the two fixing arms 30 has two positioning bands 34. The female arm 31 is provided with a notch 310 cut in the first end for fitting the pivotal connecting protrusion 206 of the curved arms 20, a second fastening element 311 to be inserted through the pivotal connecting protrusion 206 and the notch 310 to keep the female arm 31 pivotally connected with the curved arms 20, with an accommodating groove 312 formed in a second end for connecting with the male arm 32. The male arm 32 is provided with a plugging portion 320 formed at a first one end to be correspondingly inserted into the accommodating groove 312 of the female arm 31. The plugging portion 320 is provided with a slot 3200 axially cut along and near its outer wall for a third fastening element 313 inserted through an outer wall of the accommodating groove 312 to extend and tightly secured in the slot 3200, so that the length of the fixing arms 30 can be adjusted by changing the length of the plugging portion 320 inserted in the accommodating groove 312. The locking projection 33 is formed axially on the make arm 32, and the two positioning bands 34 are attached in parallel and spaced apart under the male arm 32 sidewise and extended to be tightened on the rear surface of the exterior rear mirror 40.

Figure 3:
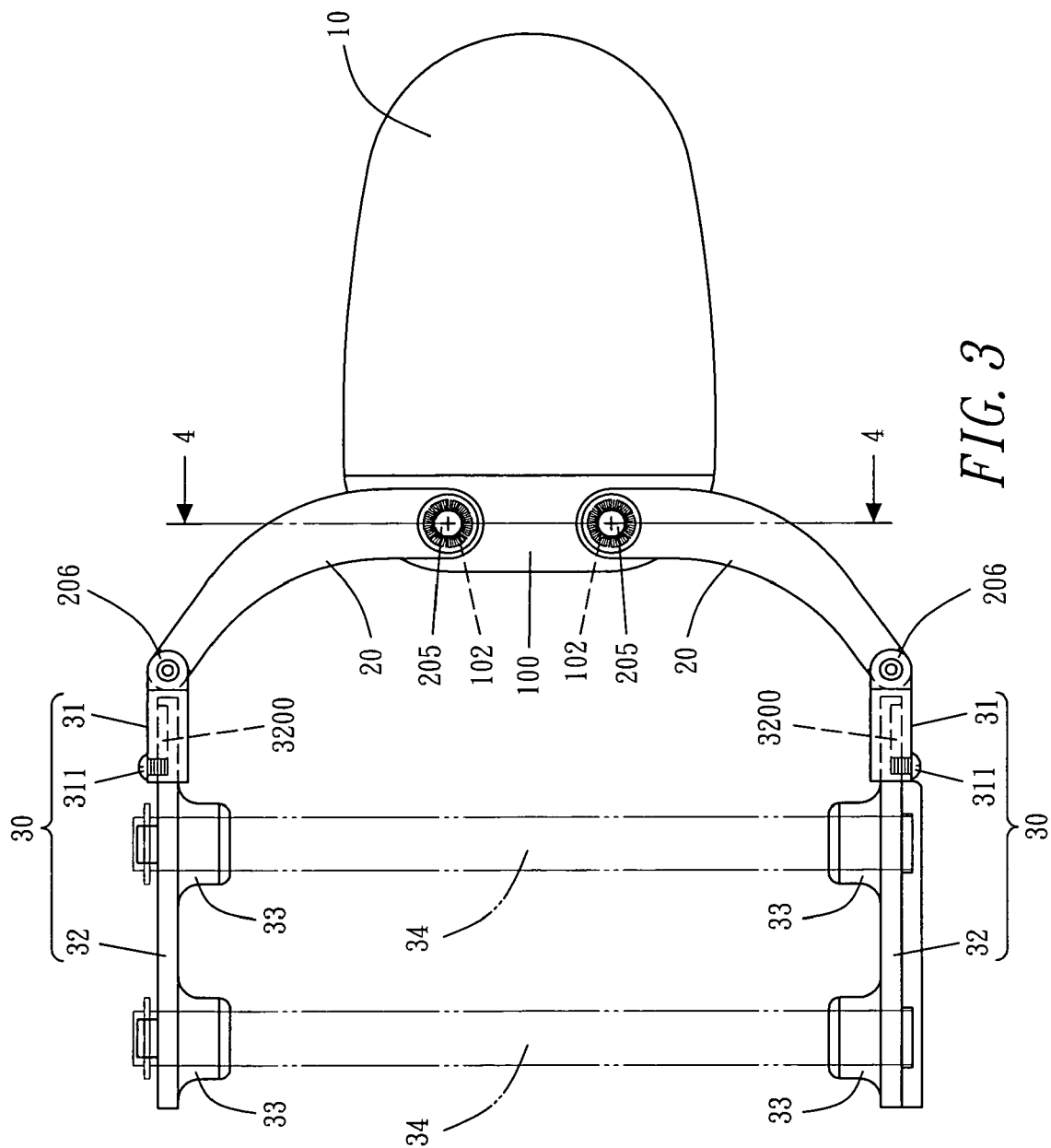
FIG. 3 is a front view of the preferred embodiment of a positioning device of a vehicle exterior auxiliary rear mirror in the present invention, showing two curved arms being adjusted to have a wide angle.
Figure 8:
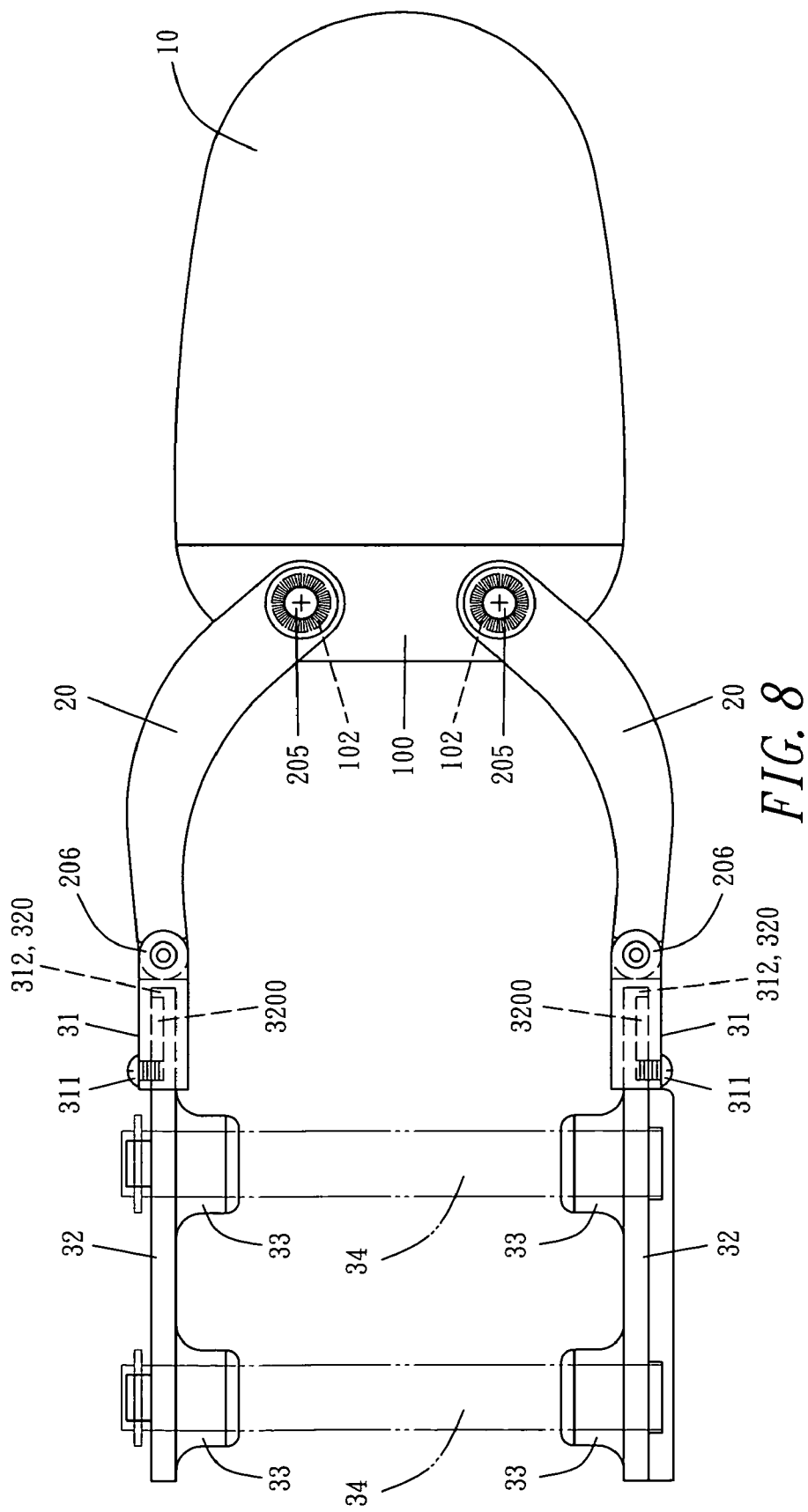
FIG. 8 is a front view of the preferred embodiment of a positioning device of a vehicle exterior auxiliary rear mirror in the present invention, showing the curved arms being adjusted to have a small angle.

In using, the first fastening elements 205 are first loosened to alter the angle of the curved arms 20 in accordance with the size of the exterior rear mirrors 40, as shown in FIGS. 3 and 8. The fixing arms 30 are next put straight by means of the pivotal connecting points of the curved arms 20 and the fixing arms 30, tightly attached on an upper and a lower surface of the casing of the exterior rear mirror 40, with the locking projections 33 hooked with the edge of the casing and the positioning bands 34 tightly fastened on the casing. Then, the fastening elements 25 can be tightly fastened to enable the auxiliary rear mirror 10 positioned on the exterior rear mirror 40.

Figure 9:
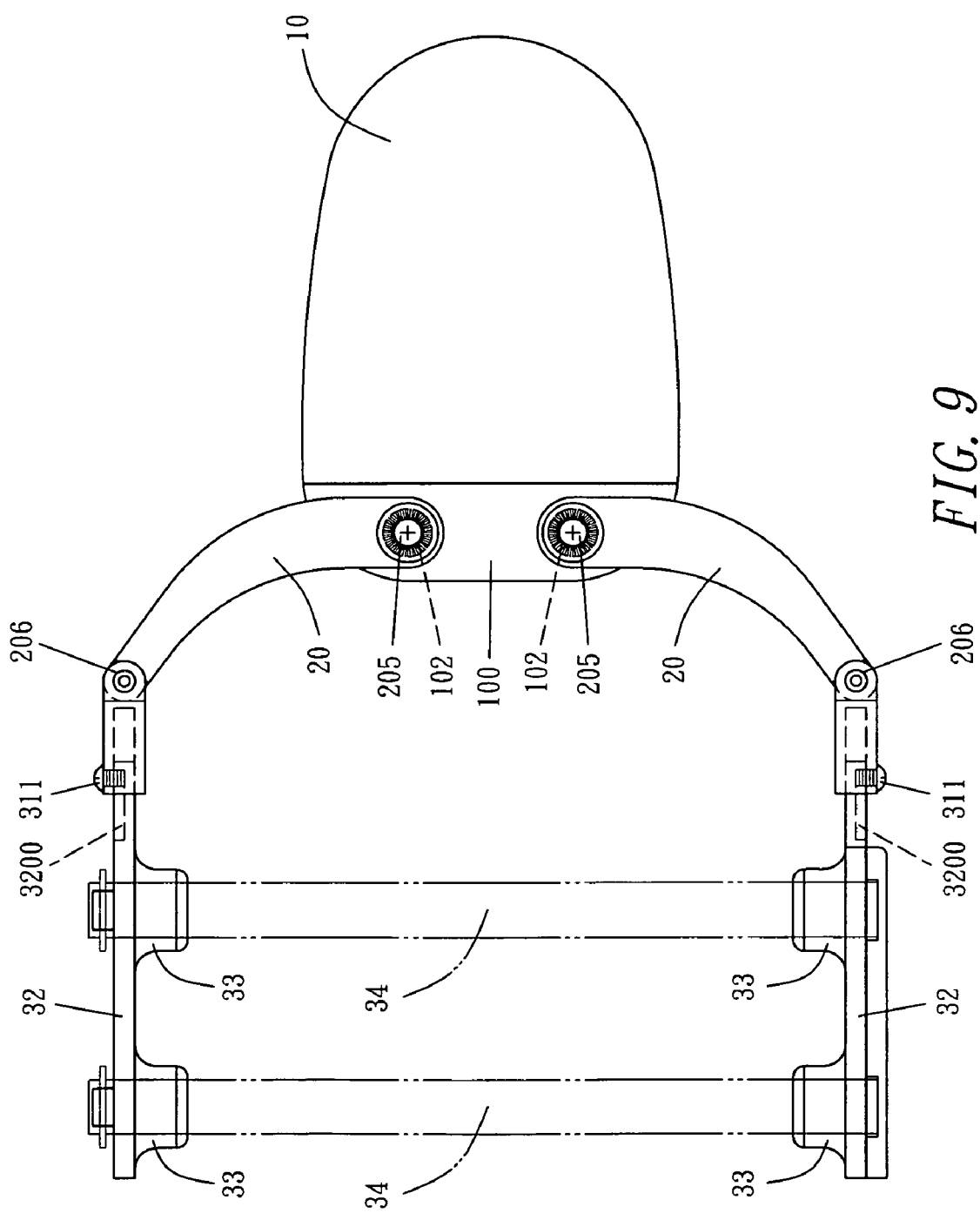
FIG. 9 is a front view of the preferred embodiment of a positioning device of a vehicle exterior auxiliary rear mirror in the present invention, showing the fixing arms being extended to have a largest length.

After the positioning device is installed on a large exterior rear mirror 40, and if the curved arms 20 are to be adjusted to form a big angle, the pivotal connecting points of the curved arms 20 and the fixing arms 30 are to be moved closer to the auxiliary rear mirror 10 so that the length of the exterior mirror 40 attached by the fixing arms 30 is to be shorter, as shown in FIG. 3. Thus, as shown in FIG. 9, if the fixing arm 30 is to be lengthened on the exterior rear mirror 40, the third fastening element 313 is loosened to slightly move back to enable the male arm 32 freely pulled outward, so that the fixing arm 30 can be extended to a desired length. Then, the third fastening element 313 is again tightly screwed in the slot 3200 to keep the male arm 32 immovably tightened with the female arm 31.

The advantages of the invention are described as can be seen from the foresaid description.

Counting on the pivotal connecting points of the curved arms 20 and the connecting base 100, the angle of the curved arms 20 can be easily adjusted to enable the positioning device fastened on the casing of diverse exterior rear mirrors 40, with the fixing arms 30 put straight to rest on the top and the bottom surface of the casing of the exterior rear mirror 40. And, with the male arm 32 extendable relative to the female arm 31, the fixing arms 30 can be properly changed with its length. So, the positioning device of the invention can be stably fixed on a variety of exterior rear mirrors 40.

While the preferred embodiment of the invention has been described above, it will be recognized and understood that various modifications may be made therein and the appended claims are intended to cover all such modifications that may fall within the spirit and scope of the invention.

What is claimed is:

1. A positioning device of a vehicle exterior auxiliary rear mirror comprising:
    a connecting base integrally formed on a back of an auxiliary rear mirror near a vehicle exterior rear mirror and shaped rectangular with two pivotal connecting points properly spaced apart at one side;
    two curved arms respectively having a first end pivotally connected with said connecting points of said connecting base; and
    two fixing arms respectively having a first one end pivotally jointed with a second end of said curved arms, a second end of each said fixing arm provided with two locking projections axially formed on an upper surface and two positioning bands crossly extended for being tightened on a rear surface of said exterior rear mirror;
    wherein each said pivotal connecting points of said connecting base is provided with a tube with female-threads vertically extended up, each said curved arm provided with a through hole bored in its one end for being inserted by the tube, said through hole having a diameter gradually tapered from a top to a bottom, an elastic element mounted around said tube in an upper portion of said through hole, a washer laid on a top of said through hole, a first fastening element inserted through said washer to threadably engage with said tube so as to keep said curved arms pivotally fixed with said connecting base.

2. The positioning device of a vehicle exterior auxiliary rear mirror as claimed in claim 1, wherein said connecting base is provided with a first annular gear teeth formed around a bottom of said tube respectively to correspond to a second annular gear teeth formed around a circumference of one side of said through hole of said curved arms, said first annular gear teeth tightly engaged with said second annular gear teeth by an elastic force of said elastic element.

3. A positioning device of a vehicle exterior auxiliary rear mirror comprising:
    a connecting base integrally formed on a back of an auxiliary rear mirror near a vehicle exterior rear mirror and shaped rectangular with two pivotal connecting points properly spaced apart at one side;
    two curved arms respectively having a first end pivotally connected with said connecting points of said connecting base; and
    two fixing arms respectively having a first one end pivotally jointed with a second end of said curved arms, a second end of each said fixing arm provided with two locking projections axially formed on an upper surface and two positioning bands crossly extended for being tightened on a rear surface of said exterior rear mirror;
    wherein each of said fixing arms is composed of a female arm and a male arm able to be connected together;
    wherein said female arm is provided with an accommodating groove formed in one end for fitting a plugging portion formed at one end of said male arm, said plugging portion provided with a slot axially cut along and near an outer wall for one end of a third fastening element inserted through an outer wall of said accommodating groove to extend into to be tightly secured in said slot so that a length of said fixing arms can be adjusted by changing a length of said plugging portion of said male arm inserted in said accommodating groove of said female arm.

* * * * *